United States Patent
Jacobsen

(10) Patent No.: US 7,607,354 B2
(45) Date of Patent: Oct. 27, 2009

(54) DIFFERENTIAL PRESSURE SENSOR ARRANGEMENT AND ASSOCIATED DIFFERENTIAL PRESSURE SENSOR

(75) Inventor: Kjeld Winther Jacobsen, Randers (DK)

(73) Assignee: Grundfos Management a/s, Bjerringbro (DK)

( * ) Notice: Subject to any disclaimer, the term of this patent is extended or adjusted under 35 U.S.C. 154(b) by 246 days.

(21) Appl. No.: 11/850,093

(22) Filed: Sep. 5, 2007

(65) Prior Publication Data
US 2008/0016966 A1 Jan. 24, 2008

Related U.S. Application Data

(63) Continuation of application No. PCT/EP2006/001880, filed on Mar. 2, 2006.

(30) Foreign Application Priority Data

Mar. 5, 2005 (EP) .................... 05004893

(51) Int. Cl.
*G01L 13/02* (2006.01)
*G01L 15/00* (2006.01)
(52) U.S. Cl. ........................................ 73/716
(58) Field of Classification Search ............... 73/716
See application file for complete search history.

(56) References Cited

U.S. PATENT DOCUMENTS

| | | | | |
|---|---|---|---|---|
| 4,823,604 A * | 4/1989 | Silverwater | ........... | 73/717 |
| 5,804,735 A | 9/1998 | Biskup | | |
| 6,267,159 B1 | 7/2001 | Adolf et al. | | |
| 6,311,561 B1 | 11/2001 | Bang et al. | | |
| 6,418,793 B1 | 7/2002 | Pechoux et al. | | |
| 6,536,288 B2 * | 3/2003 | Scholz et al. | ........... | 73/718 |
| 6,568,275 B2 * | 5/2003 | Scholz et al. | ........... | 73/718 |
| 6,640,640 B2 * | 11/2003 | Scholz et al. | ........... | 73/716 |
| 6,651,509 B2 * | 11/2003 | Scholz et al. | ........... | 73/756 |
| 7,278,318 B2 * | 10/2007 | Dannhauer et al. | ........... | 73/716 |
| 2003/0005773 A1 | 1/2003 | Scholz et al. | | |

FOREIGN PATENT DOCUMENTS

| | | |
|---|---|---|
| DE | 4244257 A1 | 6/1994 |
| DE | 10014634 A1 | 10/2000 |
| EP | 417317 A1 * | 3/1991 |
| EP | 1353160 A | 10/2003 |
| WO | 02/055978 A | 7/2002 |

* cited by examiner

*Primary Examiner*—Lisa M Caputo
*Assistant Examiner*—Jermaine Jenkins
(74) *Attorney, Agent, or Firm*—Panitch Schwarze Belisario & Nadel LLP

(57) ABSTRACT

The invention relates to a differential pressure sensor array comprising a differential pressure sensor which is inserted in a receiving space in the direction of the longitudinal axis thereof. At least one sealing element that separates the receiving space into a first and a second pressure zone when the differential pressure sensor is inserted is disposed on the differential pressure sensor and/or in the receiving space. The first pressure zone is embodied entirely in an area located between a peripheral surface of the differential pressure sensor surrounding the longitudinal axis and an interior wall of the receiving space which faces said peripheral surface. At least one section of the first pressure zone extends only across a subarea of the peripheral surface in the circumferential direction. Also disclosed is an associated differential pressure sensor.

18 Claims, 4 Drawing Sheets

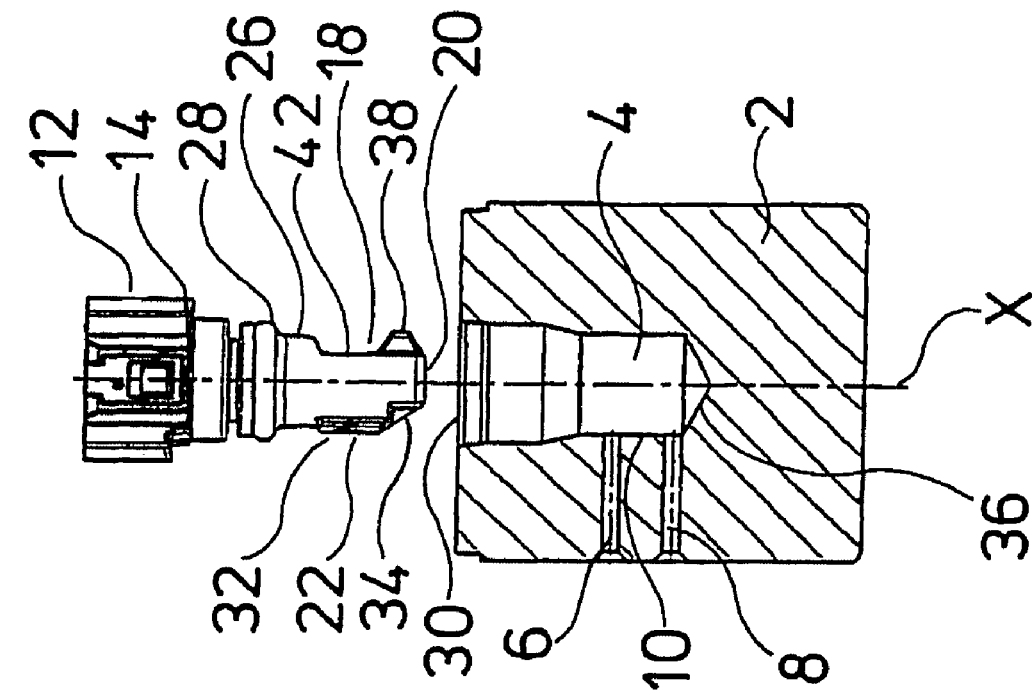
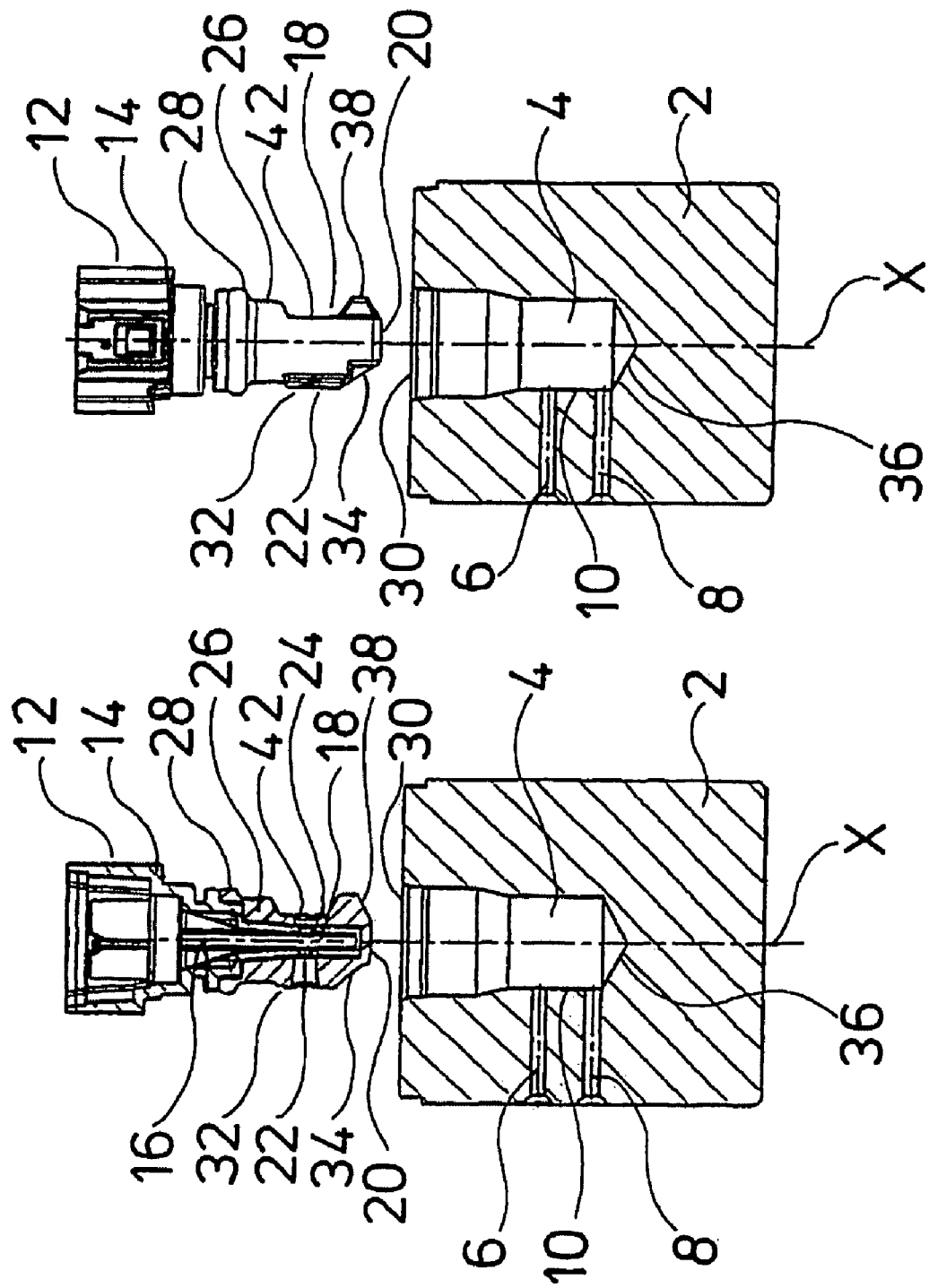

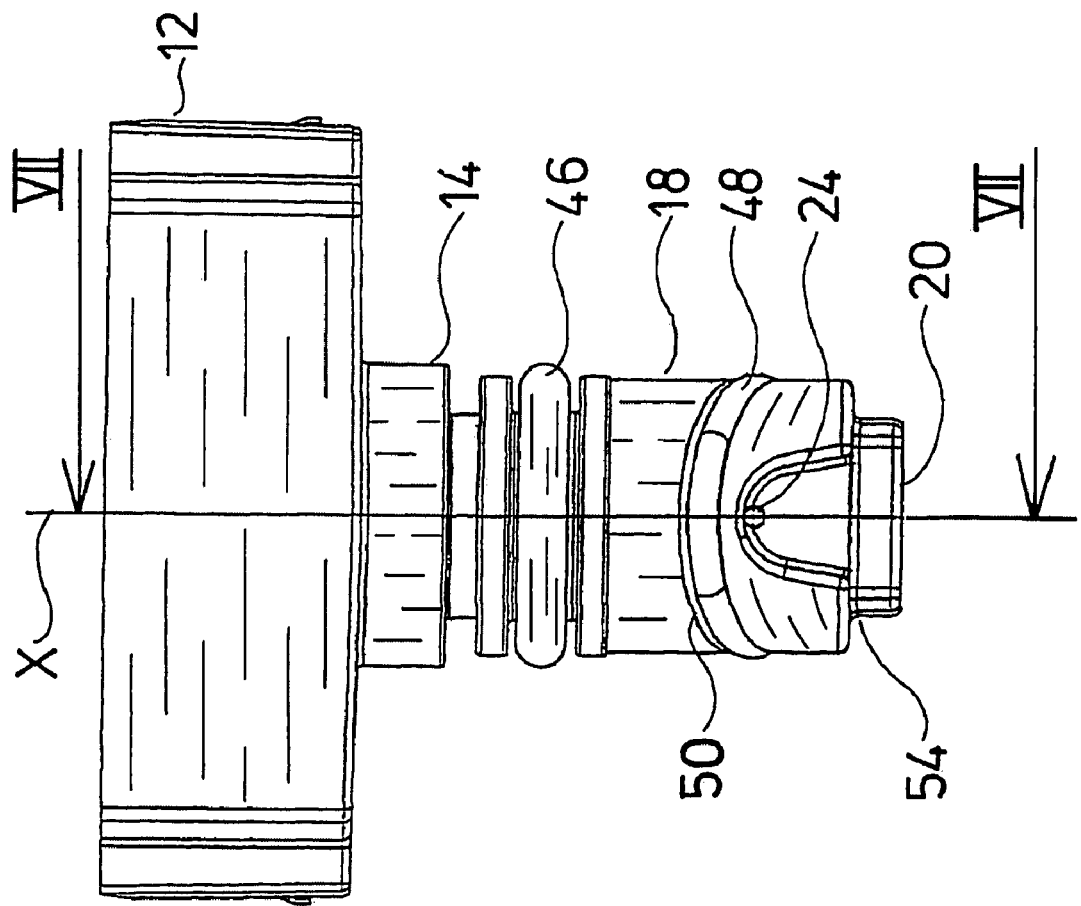
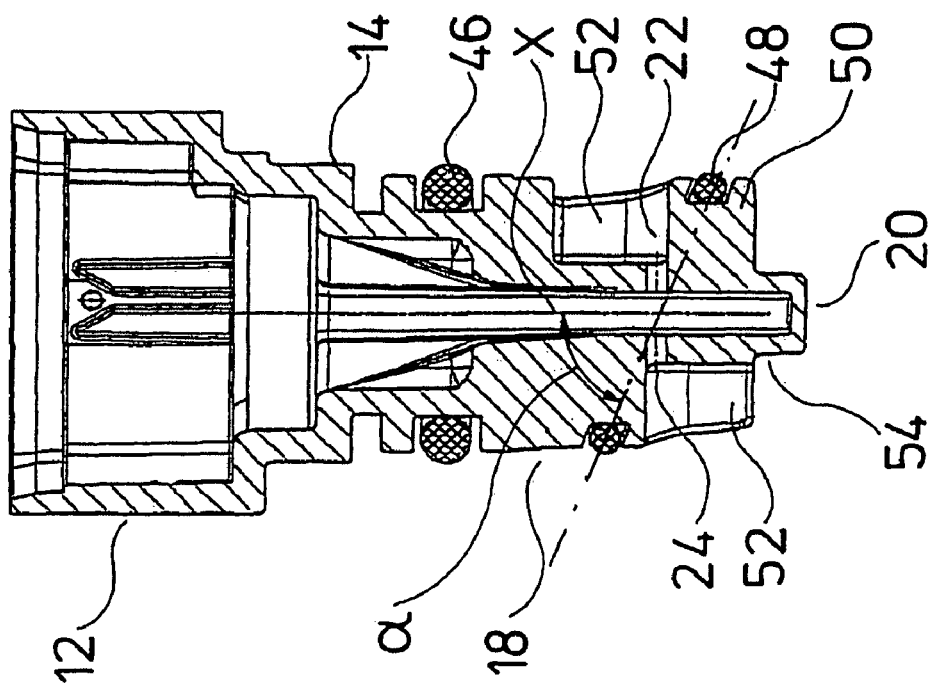

DIFFERENTIAL PRESSURE SENSOR ARRANGEMENT AND ASSOCIATED DIFFERENTIAL PRESSURE SENSOR

CROSS-REFERENCE TO RELATED APPLICATIONS

This application is a continuation of International Application No. PCT/EP2006/001880, filed Mar. 2, 2006, which was published in the German language on Sep. 14, 2006, under International Publication No. WO 2006/094692 A1, the disclosure of which is incorporated herein by reference.

BACKGROUND OF THE INVENTION

The invention relates to a differential pressure sensor arrangement, as well as to an associated differential pressure sensor.

A differential pressure sensor with a membrane as a measurement element is known from European published patent application EP 1 353 160 A1, wherein the membrane may be impinged by pressure from both surfaces, so that the differential pressure between the two membrane surfaces may be determined via the deflection or the strains occurring in the membrane.

BRIEF SUMMARY OF THE INVENTION

It is the object of the present invention to further develop a differential pressure sensor and to provide an associated differential pressure sensor arrangement, which permits a simple assembly of the differential pressure sensor in a component receiving the differential pressure sensor.

This object is achieved by a differential pressure arrangement having a differential pressure sensor, which is inserted in the direction of its longitudinal axis into a receiver space, wherein at least one sealing element which divides the receiver space into a first and a second pressure zone when the differential pressure sensor is inserted, is arranged on the differential pressure sensor and/or in the receiver space, characterized in that the first pressure zone is formed completely in a region between a peripheral surface of the differential pressure sensor surrounding the longitudinal axis, and an inner wall of the receiver space which faces this peripheral surface, and at least one section of the first pressure zone extends in the peripheral direction only over a portion of the peripheral surface.

The object is also achieved by differential pressure sensor for application in such a differential pressure sensor arrangement, characterized in that at least one sealing element is arranged on the peripheral surface of the differential pressure sensor, and divides the peripheral surface in the peripheral direction into a first and a second surface region, of which the first surface region extends exclusively over the peripheral surface, and in the peripheral direction only over a portion of this peripheral surface.

The differential pressure sensor arrangement according to the invention comprises a differential pressure sensor and a receiver space, in which the differential pressure sensor is inserted. The receiver space is thus part of a component or assembly, into which the differential pressure sensor is to be integrated, for example a pump- or heating assembly. Here, the receiver space comprises connections to two regions or media, between which a differential pressure is to be determined. For example, the receiver space may be in connection with two pressure conduits, or a pressure conduit and the surroundings. In order to be able to lead the pressures prevailing at the receiver space, separately from one another, to the pressure recording regions for acquiring the differential pressure at the differential pressure sensor, at least one sealing element which divides the receiver space into first and second pressure zones, with the differential pressure sensor in its inserted position, is arranged on the differential pressure sensor and/or in the receiver space. The differential pressure sensor is arranged such that its pressure recording regions are assigned to these two pressure zones, so that the differential pressure sensor may detect the pressure difference between the two pressure zones.

According to the invention, the first pressure zone is formed completely in a region between a peripheral surface of the differential pressure sensor surrounding the longitudinal axis, and an inner wall of the receiver space which faces this. This means that the first pressure zone does not extend over the region of the end face of the differential pressure sensor, which is preferably situated at the front in the insert direction of the differential pressure sensor into the receiver space. The peripheral surface forms a surface, preferably a cylindrical surface, in particular a circular cylindrical surface, which surrounds the longitudinal axis of the pressure sensor with a spacing. The cross-sectional contour of the pressure sensor may, however, also be formed infinitely differently, so that the peripheral surface assumes a corresponding course. The longitudinal axis of the pressure sensor is preferably the axis in whose direction the pressure sensor is inserted into the receiver space, which is particularly preferably designed as a pocket hole.

The sealing element is situated between the pressure sensor and the inner wall of the receiver space, and may be fastened to one of the two components or to both.

According to one embodiment of the invention, the sealing element, which separates the first pressure zone from the second pressure zone, does not bear on the base of a receiver space designed as a pocket hole, but merely on the peripheral inner wall of the receiver space. The design of the first pressure zone only in the peripheral region of the pressure sensor has the advantage that one may achieve an improved sealing between the first pressure zone and the second pressure zone.

Furthermore, the first pressure zone according to an embodiment of the invention, is designed such that at least one section of the first pressure zone does not extend in the peripheral direction over the whole peripheral surface, but only over a portion thereof. This means, that adjacent to this section of the first pressure zone, a section of the second pressure zone on the peripheral surface is also arranged in the same cross-sectional plane of the pressure sensor, which extends normally to its longitudinal axis. The mentioned section of the first pressure zone is thus arranged in a cross-sectional plane of the pressure sensor, offset in the peripheral direction to a section of the second pressure zone. A compact arrangement to one another of the pressure- or fluid connections in the receiver space and of the pressure openings of the pressure sensor may be achieved in this manner design. A reliable sealing of the two pressure zones to one another is also possible.

Preferably, first and second pressure openings are formed on the peripheral surface of the differential pressure sensor and face the peripheral inner wall of the receiver space. The first and second pressure openings are further preferably arranged diametrically opposite on the periphery of the differential pressure sensor. Here, the pressure openings may be arranged in the same cross-sectional plane or also offset to one another in the direction of the longitudinal axis of the pressure sensor. The pressure openings create the connection to the actual measurement element, preferably a membrane, arranged in the inside of the pressure sensor. Here, in each case a pressure opening is in connection with one side of the measurement membrane, so that the pressures whose difference is to be determined, bear on both sides of the membrane, and the differential pressure may be determined via strains occurring in the membrane.

Further preferably, the first pressure opening lies opposite a first fluid entry of the receiver space, when the differential pressure sensor is inserted in the receiver space, wherein the part of the peripheral surface of the differential pressure sensor, which surrounds this first pressure opening, sealingly bears on the region of the inner wall of the receiver space which surrounds the first fluid entry. With this design, the first pressure zone, in which the first pressure opening and the first fluid entry lie, is essentially formed only by the pressure opening itself. The remaining region surrounding the pressure sensor forms the second pressure zone. This means that only a very small sealing surface, which surrounds the first pressure opening, is required between the differential pressure sensor and the inner wall of the surrounding receiver space, in order to separate the first and second pressure zones from each other. The use of a smaller sealing element becomes possible on account of the size reduction of the sealing surface. Furthermore, the danger of leakage between the two pressure zones is further reduced on account of the shorter border or sealing line between the first and second pressure zones.

Usefully, a sealing element surrounding the first pressure opening of the differential pressure sensor is provided, in order to seal the first pressure opening with respect to the surrounding part of the receiver space, i.e., with respect to the second pressure zone. The sealing element may, for example, be designed as an O-ring, which is placed between the peripheral surface of the differential pressure sensor and the inner wall of the receiver space. For this purpose, receiver grooves- and/or shoulders for the O-ring may be provided on the inner wall of the receiver space, and/or surrounding the pressure opening of the pressure sensor. Alternatively, a differently designed sealing element may also be provided, which seals the first pressure opening with respect to the surrounding part of the receiver space. This sealing element may be firmly connected to the inner wall of the receiver space or the peripheral surface of the differential pressure sensor. The sealing element forms a sealed connection between the first fluid entry of the receiver space and the first pressure opening of the inserted differential pressure sensor, wherein the flow passage created in this manner is sealed with respect to the surrounding receiver space, which forms the second pressure zone.

Particularly preferably, the sealing element surrounding the first pressure opening may be designed in a manner such that the differential pressure sensor, at least in a region surrounding the first pressure opening, is provided with an elastic surface. This elastic surface comes to bear on the inner wall of the receiver space, preferably surrounding the first fluid entry of the receiver space, and thus creates the sealing of the connection between the first fluid entry and the first pressure opening with respect to the surrounding receiver space. The elastic surface of the differential pressure sensor may form an integral constituent of the differential pressure sensor, so than no separate sealing element is required.

According to a further preferred embodiment, a section of the second pressure zone is arranged between a section of the peripheral surface of the differential pressure sensor opposite to the first pressure opening of the differential pressure sensor, and the surrounding inner wall of the receiver space. This means that regions of the first and second pressure zones lie diametrically opposite one another, i.e., they are spaced from one another, on the peripheral surface of the pressure sensor, in a cross-sectional region of the pressure sensor. This is preferably the cross-sectional region in which the pressure opening of the pressure sensor and/or the fluid openings of the receiver space are arranged.

The above-mentioned arrangements of the first and second pressure zones on peripheral regions, which are diametrically opposite with respect to the longitudinal axis of the pressure sensor, further permits a design in which the fluid pressure itself produces a pressing force on the sealing element arranged between the peripheral surface of the differential pressure sensor and the inner wall of the receiver space. This ensures a reliable sealing between the first and second pressure zones. This is achieved in that a second fluid entry to the receiver space, which is in connection with the second pressure zone, is the fluid entry which is envisaged for contact with a higher fluid pressure than the first fluid entry.

It is clear right from the start, with many applications of the differential pressure sensor, that one of the two pressures, between which the differential pressure is to be determined, is always greater than the other on account of the arrangement. With such an arrangement, one may ensure that the higher pressure always prevails at the second fluid entry. If the second fluid entry is now in connection with the second pressure zone, arranged diametrically opposite the first pressure zone, then the higher fluid pressure effects a pressure force running transversely to the longitudinal axis of the sensor, in the direction of the first pressure zone, i.e., the differential pressure sensor is pressed in the region of the first pressure zone in the direction of the inner wall of the receiver space, so that a sealing element arranged there, is held securely bearing on the inner wall of the receiver space and/or the peripheral surface of the differential pressure sensor. This makes particular sense with the embodiment in which the sealing element surrounds the first pressure opening in its peripheral region, and the first pressure opening lies directly opposite the first fluid entry of the receiver space. Here, one succeeds in the fluid pressure, which acts on the side of the peripheral surface spaced from the first pressure opening, maintaining a sealed bearing of the region surrounding the first pressure opening, on the sealing element or the inner wall of the receiver space.

For encouraging this effect, the differential pressure sensor, in the region surrounding the first pressure opening, bears on the inner wall of the receiver space with less than half of its peripheral surface. In this manner, one ensures that the region of the peripheral surface, which lies diametrically opposite and which lies in the second pressure zone, is larger than the oppositely lying peripheral surface, which lies in the region of the first pressure zone. This has the effect that the surface on which the fluid pressure prevailing in the second pressure zone acts is larger than the surface on which the fluid pressure prevailing in the first pressure zone acts. Since the surfaces are arranged opposite to one another, the forces produced by the pressures prevailing in the first and second pressure zones are directed opposite to one another, whereby the force produced in the second pressure zone is larger than that force produced in the first pressure zone, on account of the larger peripheral surface and, in particular, on account of the higher fluid pressure, so that the differential pressure sensor is pressed in the direction of the first pressure zone transversely to its longitudinal axis, and thus produces a sealing bearing in the peripheral region of the first pressure opening.

According to a special embodiment of the invention, at least one section of the differential pressure sensor arranged in the inner receiver space comprises a casing of an elastic material, which when the pressure sensor is inserted, comes to bear on the inner wall of the receiver space, in a manner such that this is sealed to the outside. The receiver space is preferably designed as a pocket hole, which with an inserted pressure sensor, must be sealed towards its opening. For this, a sealing element is provided in the region facing the opening of the receiver space, between the pressure sensor and the inner wall of the receiver space. This sealing element may be formed by an elastic casing of the differential pressure sensor. The casing may be placed on the differential pressure sensor as a separate component, or instead integrally formed with the differential pressure sensor or firmly connected to this. The assembly is simplified in this manner, since no separate sealing element, such as an O-ring, needs to be provided for sealing the receiver space to the outside.

Further preferably, the casing is formed by an adapter which defines the outer shape of the differential pressure and which is placed on the outside of the differential pressure sensor. This design has the advantage that the casing simultaneously assumes two functions. On the one hand, the casing forms the sealing element, which seals the receiver space to the outside, with the differential pressure sensor inserted. Furthermore, the casing simultaneously serves as an adapter, which adapts the outer shape of the differential pressure sensor to a special application purpose, in particular to the shape and size of the receiver space. This permits one and the same pressure sensor to be used for different application purposes, wherein one merely needs to place different adapters onto the differential pressure sensor. The elastic casing may simultaneously also form the sealing element which, with an inserted differential pressure sensor, divides the receiver space into the first and second pressure zones. In particular, the elastic casing is preferably designed as a sealing surface in the region surrounding a first pressure opening of the differential pressure sensor, and sealingly comes to bear on the inner wall of the receiver space in a region surrounding the first fluid opening of the receiver space.

According to a further preferred embodiment of the invention, a sealing ring extending around the peripheral surface of the differential pressure sensor is arranged between the differential pressure sensor and the inner wall of the receiver space, and divides the receiver space into the first and second pressure zones. The sealing ring extends around the peripheral surface of the differential pressure sensor in a manner such that its longitudinal axis, in whose direction the differential pressure sensor is inserted into the receiver space, extends transversely to the plane spanned by the sealing ring, i.e., the longitudinal axis does not lie in the plane spanned by the sealing ring. With this arrangement too, it is ensured that the separation between the first and second pressure zones is effected in the peripheral region of the pressure sensor and not on its end face, by which means a secure sealing between the first and second pressure zones may be achieved.

Preferably, the sealing ring runs inclined to a cross-sectional plane of the differential pressure sensor, in a manner such that the first and second pressure zones on the peripheral surface of the differential pressure sensor, are situated on opposite sides of the sealing ring. The plane spanned by the sealing ring thereby runs obliquely to the longitudinal axis of the pressure sensor at an angle of smaller than 90°. In this manner, one succeeds in having the sealing ring at the one peripheral side lying closer to the end face of the differential pressure sensor in the direction of its longitudinal axis, than the diametrically opposite peripheral side of the differential pressure sensor. In this manner, despite this, on using a sealing ring, one succeeds in parts of the first and parts of the second pressure zones being situated in the same cross-sectional plane of the differential pressure sensor, wherein the first and second pressure zones are arranged in this region on opposite sides of the peripheral surface of the differential pressure sensor. This permits the pressure openings of the differential pressure sensor to be able to lie on its peripheral surface and preferably also the fluid entries of the receiver space in the same cross-sectional plane, i.e., at the same position in the direction of the longitudinal axis of the differential pressure sensor, so that a compact arrangement of the required connections on the receiver space is achieved. Alternatively, the pressure openings on the differential pressure sensor may be offset to one another in the direction of its longitudinal axis, so that a smaller inclination angle of the sealing ring to the cross-sectional plane of the pressure sensor is sufficient.

The invention further relates to a differential pressure sensor which may be applied in the previously described differential pressure sensor arrangement. According to the invention, this differential pressure sensor on its peripheral surface comprises at least one sealing element, which divides the peripheral surface in the peripheral direction into first and second surface regions. The sealing element may be designed as a separate component, which is placed onto the differential pressure sensor or may be an integral constituent of the differential pressure sensor or its peripheral surface. The first and second surface regions are, in each case, regions which, when the pressure sensor is inserted into an associated receiver space, face first and second pressure zones of the receiver space. This means that the sealing element, which is arranged on the differential pressure sensor, is the sealing element which divides the receiver space into the first and second pressure zones, when the differential pressure sensor is in its inserted state. According to the invention, the sealing element here is arranged such that the first surface region extends exclusively over the peripheral surface and simultaneously in the peripheral direction only over a portion of this peripheral surface. This means that a cross-sectional region of the differential pressure sensor exists, whose peripheral line has sections belonging to the first surface region as well as the second surface region. The first surface region is arranged such that it is arranged exclusively in the peripheral region, i.e., the first surface region does not extend over the end-face of the pressure sensor.

Preferably, a first pressure opening of the differential pressure sensor is formed in the first surface region, and a second pressure opening of the differential pressure sensor is formed in the second surface region. The two pressure openings, in each case, are connected to the actual measurement element in the inside of the differential pressure sensor, preferably with a measurement membrane, whereby the first pressure opening is in connection with a first surface of the membrane, and the second pressure opening is in connection with a second surface of the membrane.

The sealing element is preferably designed as a sealing surface surrounding the first pressure opening. This means that the region of the peripheral surface of the differential pressure sensor surrounding the first pressure opening comprises a sealing material with preferably elastic characteristics, which may come to sealingly bear on the inner wall of a receiver space. The sealing surface may be formed by an elastic casing of the peripheral surface of the differential pressure sensor.

According to an alternative embodiment, the sealing element is designed as a sealing ring which extends over the periphery of the differential pressure sensor, inclined to the cross section of the differential pressure sensor. This means that the sealing ring extends in a manner such that the longitudinal axis of the differential pressure sensor extends transversely to a plane spanned by the sealing ring. On account of the inclination of the sealing ring, one succeeds in having the sealing ring cross a peripheral line, so that a first section of the peripheral line lies in the first surface region, and a second section of the peripheral line lies in the second surface region. In this manner, with a differential pressure sensor inserted into a receiver space, the sealing ring may divide the receiver space into first and second pressure zones, such that sections of the first pressure zone as well as sections of the second pressure zone are situated along a peripheral line of the differential pressure sensor.

Particularly preferably, the differential pressure sensor comprises a preferably removable casing of an elastic material, which surrounds at least the part of the differential pressure sensor in which pressure openings are formed, and defines the outer contour of the differential pressure sensor including the sealing element. This means that the sealing element is integrally formed with the casing. This may be used with a sealing element which is formed as a sealing ring and which extends over the periphery of the differential pressure sensor, as well as with a sealing element which is designed as a sealing surface surrounding the pressure opening. The elastic casing permits a standard, available differential pressure sensor to be adapted to special receiver spaces, in that a suitably designed casing is placed on the differential pressure sensor.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a cross-sectional view of the receiver space, with a sectional view of the differential pressure sensor, before insertion;

FIG. 2 shows the arrangement according to FIG. 1, with an unsectioned representation of the differential pressure sensor;

FIG. 7 is a cross-sectional view of a differential pressure sensor according to a second embodiment of the invention, along line VII-VII in FIG. 8; and.

FIG. 8 is a lateral view of the differential pressure sensor according to FIG. 7.

DETAILED DESCRIPTION OF THE INVENTION

Figure 3:
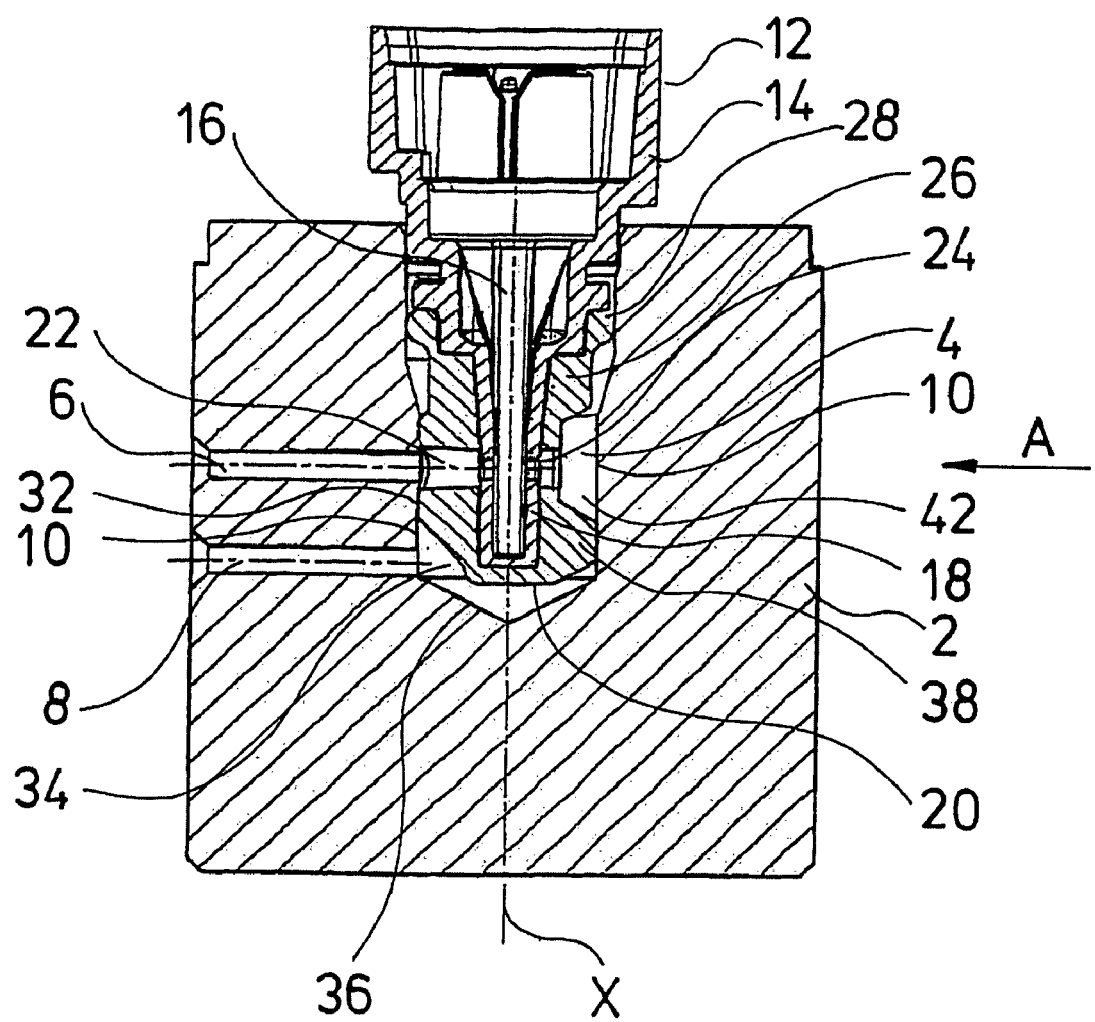
FIG. 3 is a cross-sectional view of the arrangement according to FIGS. 1 and 2, wherein the differential pressure sensor is inserted into the receiver space.
Figure 6:
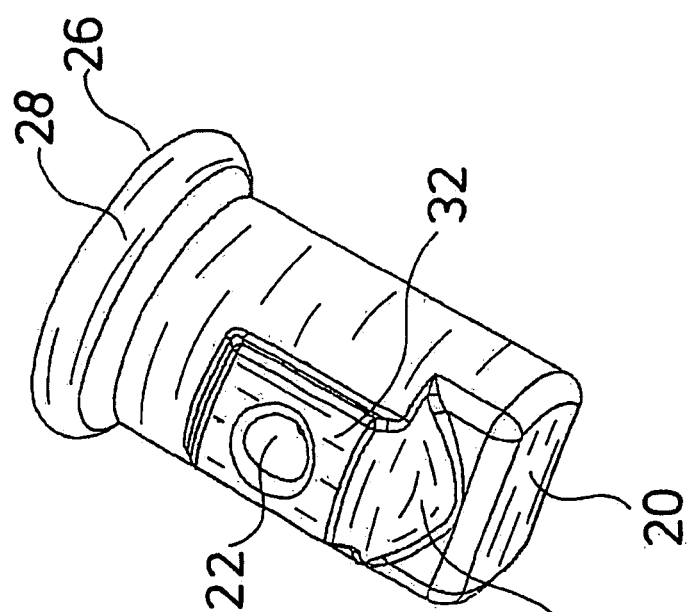
FIG. 6 is a perspective view of an adapter according to FIGS. 4 and 5, seen from the side of the first pressure opening.
Figure 5:
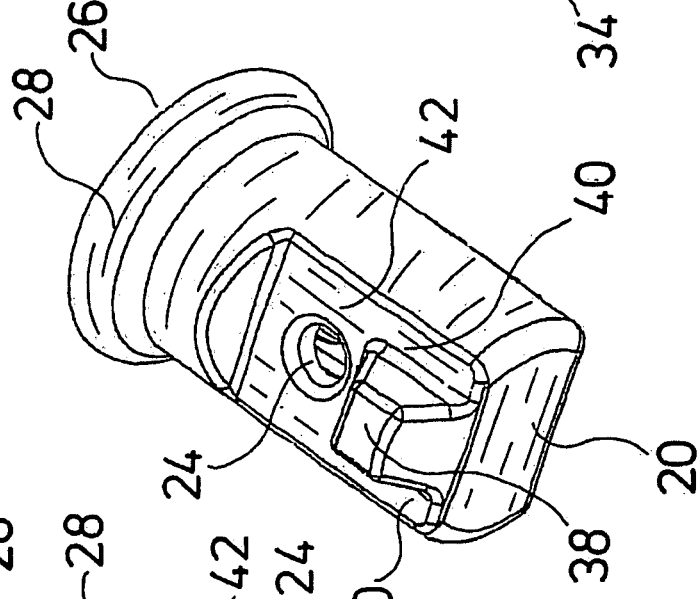
FIG. 5 is a perspective view of the adapter according to FIG. 4, seen from the side of the second pressure opening.

A first embodiment of the invention is described by way of FIGS. 1 to 6. FIGS. 1 to 3 show a receiver space 4 formed in a component 2. Here, the component 2 is any component of an assembly, into which the differential pressure sensor is to be integrated. The receiver space 4 in the shown example is designed as a pocket hole with a rotationally symmetrical design with respect to the longitudinal axis X. The receiver space 4 comprises a first fluid entry 6 and a second fluid entry 8, which run into the receiver space 4 on the peripheral inner wall 10. The pressures, whose difference is to be determined, prevail at the fluid entries 6 and 8.

In the shown example, the first fluid entry 6 and the second fluid entry 8 are arranged offset to one another at the same angular position with respect to the longitudinal axis, in the direction of the longitudinal axis X. According to alternative embodiments, the fluid entries 6 and 8 may also be arranged at different angular positions with respect to the longitudinal axis X, and in particular also at the same position in the longitudinal direction of the axis X. Thus, an arrangement lying opposite one another is also possible.

Figure 4:
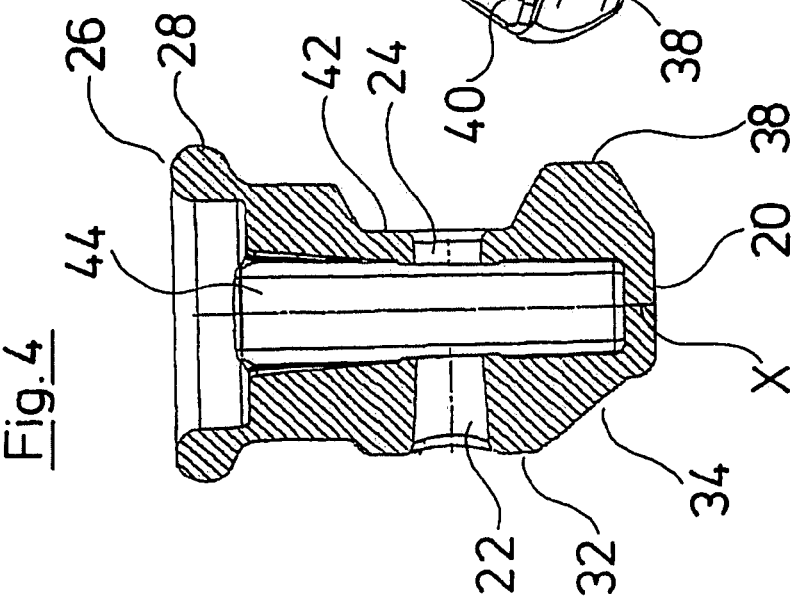
FIG. 4 is a cross-section detail view of the adapter of the differential pressure sensor according to FIGS. 1 to 3.

The receiver space 4 is designed in order to accommodate the differential pressure sensor 12, as is shown in FIG. 3. The differential pressure sensor 12 is known in its basic construction, e.g., from EP 1 353 160. The differential pressure sensor 12 comprises a housing 14, in whose inside a receiver 16 for a circuit board is arranged in the direction of the longitudinal axis X. The circuit board carries the actual measurement element, preferably in the form of a membrane, as well as electronic components. The measurement element is arranged in an axial extension 18 of the housing 14, which extends in the direction of the longitudinal axis X. The differential pressure sensor 12 is inserted into the receiver space 4, with the extension 18 having its end face 20 at the front, as shown in FIG. 4.

A connection plug for the differential pressure sensor 12, which is not described in more detail here, is formed on the housing 14 at the end of the differential pressure sensor 12, which is opposite to the end face 20 in the direction of the longitudinal axis X.

A first pressure opening 22 and a second pressure opening 24 are formed in the extension 18 on sides which are diametrically opposite with respect to the longitudinal axis X. The actual measurement element is arranged between the pressure openings 22 and 24 in the inside of the extension 18. The measurement element, as is known from EP 1 353 160, is preferably designed as a membrane, so that the two pressure opening 22 are connected to opposite surfaces of the membrane, so that the two pressures, whose difference is to be determined, may prevail on the two membrane surfaces. An adapter 26, which surrounds the extension 18 on its peripheral surface as well as on the end face 20, is placed onto the extension 18. The adapter 26 is formed of an elastic material, so that it effects the required sealing of the differential pressure sensor 12 in the inside of the receiver space 4. Furthermore, the adapter 26 has the task of adapting the extension 18 of a standard envisaged differential pressure sensor 12 to the special application purpose, and in particular to the shape of the receiver space 4. Thus, one and the same differential pressure sensor 12 may be inserted into different receiver spaces 4, in particular receiver spaces 4 with different diameters, wherein merely differently dimensioned adapters 26 are placed onto the extension 18 of the differential pressure sensor 12. The adapters 26 thus always have the same inner contour, but outer contours adapted to the respective receiver space 4. The adapter 26, as in the shown embodiment example, may be designed as a separate component, or instead integrally formed with the housing 14 of the differential pressure sensor 12, in that, for example, the housing 14 of the differential pressure sensor 12 is peripherally injected with an elastic material, in order to form the adapter 26.

The adapter 26 thus forms a casing for the extension 18 of the differential pressure sensor 12, wherein the first pressure opening 22 and the second pressure opening 24 extend in diametrically opposite directions normally to the longitudinal axis X through the walls of the adapter 26, and thus create a connection from the inside of the differential pressure sensor 12 to the outer side or the peripheral surface of the adapter 26. The peripheral surface of the differential pressure sensor, which in this case is formed on the adapter 26, is the surface which faces the inner wall 10 of the receiver space 4 in the inserted condition, with the exception of the end face 20. It is thus essentially the case of the outer surface extending around the longitudinal axis X.

On installation into the component 2, the differential pressure sensor 12 with its end face 20 at the front, is inserted in the direction of the longitudinal axis X into the receiver space 4, where the adapter 26 with its peripheral surface comes to bear on different locations of the inner wall 10 of the receiver space 4. On the one hand, the adapter 26 at its end distant to the end face 20 comprises an annular outwardly projecting bead 28. The bead 28 assumes the function of an O-ring for sealing the differential pressure sensor 12 in the receiver space 4 to the outside. This means that the bead 28 seals the opening 30 of the receiver space 4, when the differential pressure sensor 12 is in its inserted state, in that with its outer periphery, it comes to bear on the inner wall 10 near to the opening 30.

On the other hand, the adapter 26 in the vicinity of the first pressure opening 22 forms a sealing surface 32. The sealing surface 32 has an essentially rectangular contour, in whose center the first pressure opening 22 is formed. The sealing surface 32 is part of the peripheral surface and extends in an arc-like manner about the longitudinal axis X, with a radius which corresponds essentially to the radius of the receiver space 4 in the region of the first fluid entry 6. In order to have an adequate sealing, the radius in which the sealing surface 32 is spaced from the longitudinal axis X, is slightly larger than half the diameter of the receiver space 4. The sealing surface 32 extends only over a small circular arc with respect to the longitudinal axis X, which is significantly smaller than half the periphery of the peripheral surface of the adapter 26. The sealing surface 32 is designed such that when the differential pressure sensor 12 is inserted into the receiver space 4, as is shown in FIG. 4, it comes to bear on the inner wall 10 of the receiver space 4 peripherally of the first fluid entry 6. The fluid entry 6 in this inserted condition lies directly opposite the first pressure opening 22, so that these are in connection with one another. The sealing surface 32 seals the fluid connection between the fluid entry 6 and the pressure opening 22 with respect to the remaining part of the receiver space 4. The region of the connection between the fluid entry 6 and the first pressure opening 22 thus forms a first pressure zone of the receiver space 4, while the region outwardly surrounding the sealing surface 32 forms the second pressure zone.

The first pressure zone, which is limited by the sealing surface 32, is merely formed on the peripheral surface of the differential pressure sensor 12 or its adapter 26, and only extends over a partial arc of the periphery, so that a small sealing surface or sealing line is formed, which separates the two pressure zones from one another.

The second fluid entry 8 runs out in a region of the receiver space 4, in which the adapter 26 of the differential pressure sensor 12 does not bear on the inner wall 10. Here, the adapter 26 has a receding region 34, so that a free flow passage into the inside of the receiver space 4 is ensured from the fluid entry 8, also with an inserted differential pressure sensor 12. Furthermore, the end face 20 of the differential pressure sensor 12 is also spaced from the base 36 of the receiver space 4, also in the inserted condition. The peripheral surface of the adapter 26 on the peripheral side lying diametrically opposite the first pressure opening 22, is designed such that it is radially spaced from the longitudinal axis X by an amount which is smaller than half the diameter of the receiver space 4, so that the second pressure opening 24 surrounding the peripheral surface of the adapter 26 is spaced from the inner wall 10 of the receiver space 4.

The adapter 26 on this peripheral side only comprises one projection 38, whose outer side is radially spaced from the longitudinal axis X by an amount which corresponds to half the diameter of the receiver space 4. This projection 26, thus in the inserted condition of the differential pressure sensor 12, comes to bear on the inner wall 10 of the receiver space 4, in order to position the differential pressure sensor 12 firmly in the receiver space 4. The projection 28 is, however, designed so narrowly, that lateral recesses 40 are formed, which extend parallel to the longitudinal axis X and to the inner wall 10 of the receiver space 4. The recesses 40 form flow- or fluid passages between the base region of the receiver space 4, which is situated between the base 36 and the end face 20 of the differential pressure sensor 12, and the region between the second pressure opening 24 and the oppositely lying inner wall 10 of the receiver space 4. In this manner, a connection between the second fluid connection 8 and the second pressure opening 24 of the differential pressure sensor 12 is realized, which forms the second pressure zone.

The application of the previously described differential pressure sensor 12 in the component 2 is preferably effected in a manner such that the higher pressure of the pressures, between which the differential pressure is to be determined, prevails at the fluid entry 8. The higher pressure thus lies in the second pressure zone of the receiver space 4, which is in connection with the fluid entry 8.

The peripheral surface 42 of the adapter 26 which is diametrically opposite to the first pressure opening 22 and the sealing surface 32 is essentially formed larger than the peripheral surface region of the adapter 26, which is in connection with the first fluid entry 6 and faces the first pressure zone of the receiver space 4. Thus the section 42 of the peripheral surface of the differential pressure sensor 12 or of the adapter, which lies in the second pressure zone of the receiver space 4, is significantly larger. Simultaneously, an even greater pressure also acts on this surface 42, which is in connection with the fluid entry 8. A pressing force is produced in this manner, which acts in the direction of the arrow A, i.e., radially to the longitudinal axis X, onto the extension 18 of the differential pressure sensor 12. In this manner, the sealing surface 32 is pressed against the inner wall 10 of the receiver space 4 in the peripheral region of the first fluid entry 6, so that a secure sealing between the first and second pressure zones is ensured in this region.

FIGS. 4, 5 and 6 once again show detailed views of the adapter 26, which were described previously. As may be seen from the cross-sectional view in FIG. 4, the adapter 26 in its inside comprises a cavity 44 which is closed at the end face 20 of the adapter 26. The axial extension 8 of the pressure sensor 12 is inserted into the cavity 44. Thus, the adapter, on account of its elastic design, comes to sealingly bear on the surface of the axial extension 18. The first pressure opening 22 and the second pressure opening 24 extend in diametrically opposite directions through the wall of the adapter 26, from the cavity 44 to the peripheral surface of the adapter 26. The peripheral bead 28 is formed on the side which is distant to the end face, and comes to bear on the inner wall of the receiver space 4 for its sealing.

Hereinafter, a second embodiment of the invention is described by way of FIGS. 7 and 8, wherein equivalent parts are provided with the same reference numerals. FIGS. 7 and 8 merely show the differential pressure sensor 12. The receiver space 4, into which this differential pressure sensor 12 is inserted, corresponds to the receiver space described by way of FIGS. 1 to 3, i.e., the differential pressure sensor shown in FIGS. 7 and 8 may be inserted into the same receiver space.

No adapter 26 is provided with the embodiment according to FIGS. 7 and 8, but instead the housing 14 of the differential pressure sensor 12 in the region of its axial extension 18 is formed to correspond exactly to the shape of the receiver space 4. The housing 14 comprises a peripheral groove spaced from the end face 20, into which an O-ring 46 is inserted, so that the O-ring 46 extends in a rotationally symmetrical manner to the longitudinal axis X. The O-ring 46 with this embodiment assumes the function of the bead 28 according to the embodiment which is shown in FIGS. 1 to 6. This means that the O-ring 46, when the differential pressure sensor 12 is in its inserted state, seals the receiver space 4 to the outside.

Furthermore, the differential pressure sensor 12 comprises two pressure openings 22 and 24, which are in connection with the inside of the differential pressure sensor 12 and a measurement element, not shown here, which is arranged there, as is described by way of the first embodiment. With this embodiment too, the first pressure opening 22 is in connection with a first pressure zone, when the differential pressure sensor 12 is inserted into the receiver space 4, while the pressure opening 24 is in connection with a second pressure opening. The two pressure zones according to second embodiment are separated from one another by an O-ring 48, which is inserted into a groove 50 on the outer periphery of the extension 18. With an inserted differential pressure sensor 12, the O-ring 48 comes to sealingly bear on the inner wall 10 of the receiver space 4. Furthermore, the O-ring 48 sealingly bears on the base surface of the groove 50.

The O-ring 48 and the groove 50 extend obliquely or inclined at an angle a to the longitudinal axis X and thus obliquely to a cross-sectional plane normal to the longitudinal axis X. In this manner, one succeeds in having the O-ring 48, at the side at which the pressure opening 22 runs out, situated closer to the end face 20 in the direction of the longitudinal axis X than at the diametrically opposite side, at which the second pressure opening 24 runs out. In this manner, one succeeds in having the two pressure openings 22 and 24, even if they extend in the same cross-sectional plane, i.e., are located at the same position in the direction of the longitudinal axis X, running out at two surface regions of the peripheral surface of the extension 18, which are separated from one another by the O-ring 48. This means that the pressure openings 22 and 24 run out at the peripheral surface of the differential pressure sensor 12 at two opposite sides of the O-ring 48. In this manner, a first pressure zone is created exclusively peripherally of the differential pressure sensor 12 between the O-rings 48 and 46. The second pressure zone is formed on the sides of the O-ring 48 which face the end face 20, i.e., the second pressure zone extends over the end face 20 of the differential pressure sensor 12, while the first pressure zone is only situated in the peripheral region of the differential pressure sensor 12 with respect to the longitudinal axis X. Thus, on account of the oblique course of the O-ring 48, one succeeds in having parts of the first pressure zone as well as parts of the second pressure zone, on the periphery of the differential pressure sensor 12, situated in the cross-sectional plane in which the pressure openings 22 and 24 extend. This means that the first pressure zone, or the surface region which faces this, only extends over a part of the periphery in this cross-sectional plane.

Recesses 52, which permit the connection between the pressure openings 22 and 24 as well as the associated fluid entries 6 and 8 respectively, are formed on the extension 18 of the differential pressure sensor 12 in the run-out region of the first pressure opening 22 and the second pressure opening 24. Thus, the recess 52 situated at the pressure entry 22 is part of the first pressure zone, while the recess 52 which borders the pressure opening 24 is part of the second pressure zone.

If the differential pressure sensor 12 shown in FIGS. 7 and 8 is inserted into the receiver space 4 as is shown in FIGS. 1 to 3, the O-ring 48 comes to bear at the side of the pressure opening 22 of the differential pressure sensor 12 on the inner wall 10 of the receiver space 4, between the fluid entries 6 and 8. Proceeding from the fluid entry 8, a fluid passage is created via the gap between the end face 20 and the recess 52 bordering the pressure opening 24, so that the pressure prevailing at the fluid entry 8 prevails at the second pressure opening 24. The differential pressure sensor 12 at its end face 20 on the outer periphery additionally comprises a receding part or an annular recess 54, by which the connection between the second fluid entry 8 and the pressure opening 24 is created. The fluid entry 8 thereby, when the differential pressure sensor 12 is in its inserted state, preferably lies directly opposite the annular recess 54. The second pressure zone is formed in this manner between the fluid entry 8 and the pressure opening 24 on side of the O-ring. The first fluid entry 6 lies directly opposite the recesses 52 connecting to the first pressure opening 22, so that a fluid passage from the first fluid entry 6 to the first pressure opening 22 is formed in the region of the first pressure zone formed in the region between the O-rings 46 and 48.

Even if the second embodiment of the invention has been realized without the use of an adapter 26, as has been described by way of FIGS. 1 to 6, this embodiment may also be realized with such an adapter. There, the adapter surrounds the extension 18 peripherally and at the end face, and the O-rings 46 and 48 are integrally formed with the adapter 26 as correspondingly running beads. Alternatively, one may do away with the adapter 26 in the first embodiment, which has been described by way of the FIGS. 1 to 6. The sealing surface 32, which separates the first and second pressure zones with this embodiment, here may be designed as a separate seal, for example as an O-ring, which is applied directly onto the extension 18 or is integrated into this. Accordingly, an O-ring inserted into a groove may be used for sealing, instead of the bead 28.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A differential pressure sensor arrangement comprising: a differential pressure sensor having a longitudinal axis, the differential pressure sensor being inserted in a direction of its longitudinal axis into a receiver space, at least one sealing element dividing the receiver space into first and second pressure zones when the differential pressure sensor is in its inserted state, the at least one sealing element being arranged on the differential pressure sensor and/or in the receiver space, wherein the first pressure zone is formed completely in a region between a peripheral surface of the differential pressure sensor surrounding the longitudinal axis and an inner wall of the receiver space which faces the peripheral surface, and wherein at least one section of the first pressure zone extends in a peripheral direction only over a portion of the peripheral surface.

2. The differential pressure sensor arrangement according to claim 1, wherein first and second pressure openings are formed on the peripheral surface of the differential pressure sensor and face a peripheral inner wall of the receiver space.

3. The differential pressure sensor arrangement according to claim 2, wherein when the differential pressure sensor is inserted into the receiver space, the first pressure opening lies opposite a first fluid entry of the receiver space and a part of the peripheral surface of the differential pressure sensor which surrounds the first pressure opening sealingly bears on a region of the inner wall of the receiver space which surrounds a first fluid entry.

4. The differential pressure sensor arrangement according to claim 3, further comprising a sealing element surrounding the first pressure opening of the differential pressure sensor.

5. The differential pressure sensor arrangement according to claim 3, wherein the differential pressure sensor has an elastic surface at least in a region surrounding the first pressure opening.

6. The differential pressure sensor arrangement according to claim 3, wherein a section of the second pressure zone is arranged between a section of the peripheral surface of the differential pressure sensor which is opposite the first pressure opening and the inner wall of the receiver space.

7. The differential pressure sensor arrangement according to claim 3, further comprising a second fluid entry of the receiver space in connection with the second pressure zone for prevalence of a higher fluid pressure than the first fluid entry.

8. The differential pressure sensor arrangement according to claim 3, wherein the differential pressure sensor in a region surrounding the first pressure opening bears on the inner wall of the receiver space with less than half its peripheral surface.

9. The differential pressure sensor arrangement according to claim 3, wherein at least one section of the differential pressure sensor arranged inside the receiver space comprises a casing of an elastic material, which, when the differential pressure sensor is in its inserted state, bears on the inner wall of the receiver space, optionally in a manner such that it is sealed to the outside.

10. The differential pressure sensor arrangement according to claim 9, wherein the casing comprises an adapter which defines an outer shape of the differential pressure sensor and is placed on an outer side of the differential pressure sensor.

11. The differential pressure sensor arrangement according to claim 1, wherein first and second pressure openings are arranged on the peripheral surface of the differential pressure sensor on sides which are opposite to one another, optionally in a common cross-sectional plane of the differential pressure sensor.

12. The differential pressure sensor arrangement according to claim 1, further comprising a sealing ring extending around the peripheral surface of the differential pressure sensor, arranged between the differential pressure sensor and the inner wall of the receiver space, and dividing the receiver space into the first and second pressure zones.

13. The differential pressure sensor arrangement according to claim 12, wherein the sealing ring is arranged inclined to a cross-sectional plane of the differential pressure sensor in a manner such that the first and second pressure zones are situated on the peripheral surface of the differential pressure sensor at opposite sides of the sealing ring.

14. A differential pressure sensor for application in a differential pressure sensor arrangement according to claim 1, wherein the at least one sealing element is arranged on the peripheral surface of the differential pressure sensor and divides the peripheral surface in a peripheral direction into first and second surface regions, wherein the first surface region extends exclusively over the peripheral surface and in the peripheral direction extends only over a portion of the peripheral surface.

15. The differential pressure sensor according to claim 14, wherein a first pressure opening is located in the first surface region, and a second pressure opening is located in the second surface region.

16. The differential pressure sensor according to claim 15, wherein the at least one sealing element comprises a sealing surface surrounding the first pressure opening.

17. The differential pressure sensor according to claim 15, wherein the at least one sealing element comprises a sealing ring extending over the periphery of the differential pressure sensor inclined to a cross section of the differential pressure sensor.

18. The differential pressure sensor according to claim 14, wherein the differential pressure sensor comprises an optionally removable casing of an elastic material surrounding at least a part of the differential pressure sensor in which pressure openings are located and defining an outer contour of the differential pressure sensor including the at least one sealing element.

* * * * *